Jan. 22, 1963  R. C. ALBRECHT ET AL  3,074,115
IMPACT EXTRUSION PROCESS FOR MAKING COLLAPSIBLE
TUBES AND PREFORM FOR USE THEREIN
Filed May 28, 1959

INVENTORS
RANSOM C. ALBRECHT
EDGAR G. HEYL

BY Cushman, Darby & Cushman
ATTORNEYS

United States Patent Office 3,074,115
Patented Jan. 22, 1963

3,074,115
IMPACT EXTRUSION PROCESS FOR MAKING COLLAPSIBLE TUBES AND PREFORM FOR USE THEREIN
Ransom C. Albrecht and Edgar G. Heyl, Baltimore, Md., assignors to Crown Cork & Seal Company, Inc., Philadelphia, Pa., a corporation of New York
Filed May 28, 1959, Ser. No. 816,406
12 Claims. (Cl. 18—55)

This application is a continuation-in-part of application Serial No. 578,506, filed April 16, 1956, now abandoned, and application Serial No. 671,051, filed July 10, 1957, now Patent 2,987,775. The entire disclosure of the parent applications is hereby incorporated by reference.

The present invention relates the impact extrusion of polyethylene and polypropylene into tubes.

It has been found in the impact extrusion of polyethylene and polypropylene that there is a tendency for stress cracking. This is particularly noticeable in bottles and other containers which have been allowed to stand for a number of months. This tendency toward stress cracking reduces the utility of such impact extruded polyethylene or polypropylene.

Accordingly it is a primary object of the present invention to reduce the stress cracking of impact extruded polyethylene and polypropylene.

Another object is to prepare novel planchettes or disc-shaped blanks of polyethylene or polypropylene which aid in the elimination of stress cracking in the finished impact extruded tube or container.

An additional object is to make squeezable polyethylene containers in an improved manner.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing specially prepared planchettes or disc-shaped blanks of polyethylene or polypropylene or copolymers of ethylene and propylene.

More specifically it has been found that stress cracking can be avoided by inbending one face of the planchette or disc-shaped blank in the manner subsequently described.

Alternatively stress cracking can be reduced by using planchettes or disc-shaped blanks of irradiated polyethylene or polypropylene. As the amount of irradiation increases the greater the force required for impact extrusion. Hence the irradiation is usually kept below 8 megarad. It has also been found desirable to utilize at least 0.5 megarad of irradiation.

For best results there can be used an irradiated planchette or disc-shaped blank which also has the inbending feature.

Irradiation can be accomplished by utilizing electrons, B-rays, e.g. by employing cobalt 60, gamma rays, etc. Preferably electrons are employed utilizing any conventional source of high energy electrons, e.g. the Van der Graaff 2,000,000 volt electrostatic generator or the General Electric 1,000,000 volt or 2,000,000 volt Resonant Transformers.

The process of impact extrusion according to the invention is especially suitable for forming tubes, squeezable bottles and other containers from polyethylene or polypropylene. The polyethylene or polypropylene can have a molecular weight of from 2,000 to 25,000 or even much higher, e.g. 1,000,000 or over. Usually the molecular weight is between 7,000 and 25,000, preferably between 12,000 and 18,000.

The polyethylene can be modified with minor amounts of other materials. For example, there can be used 5% or less of substances, e.g. 1 or 2% of polyisobutylene (Vistanex) or 1 or 2% of isobutylene-diolefine copolymer, e.g., isobutylene-isoprene and isobutylene-butadiene (Butyl rubber), 1 or 2% of hydrocarbon waxes, such as paraffin wax having a melting point of 133° to 135° F., fillers, such as calcium carbonate, e.g., in an amount of 10%, titanium dioxide in an amount of 1%, stearates such as calcium and butyl stearates, as well as pigments, etc.

The presence of either polyisobutylene or Butyl rubber improves the stretching characteristics and, to some extent, appears to improve the strength of the composition. The paraffin waxes and the stearates serve as lubricants in the forming operation. The fillers referred to, in addition to their pigmenting qualities, in the present instance, help to improve the stretching characteristics without substantially impairing the breaking point. This is noticeable, for example, when 15% of calcium carbonate is mixed with the polyethylene. In this connection, the stearates also appear to help the stretching qualities of the polyethylene composition.

The drawings illustrate the formation of cylindrical tubes having heads of reduced diameter impact extruded from a planchette of polyethylene having a molecular weight of about 18,000.

Figures 1, 2, 3, 4:
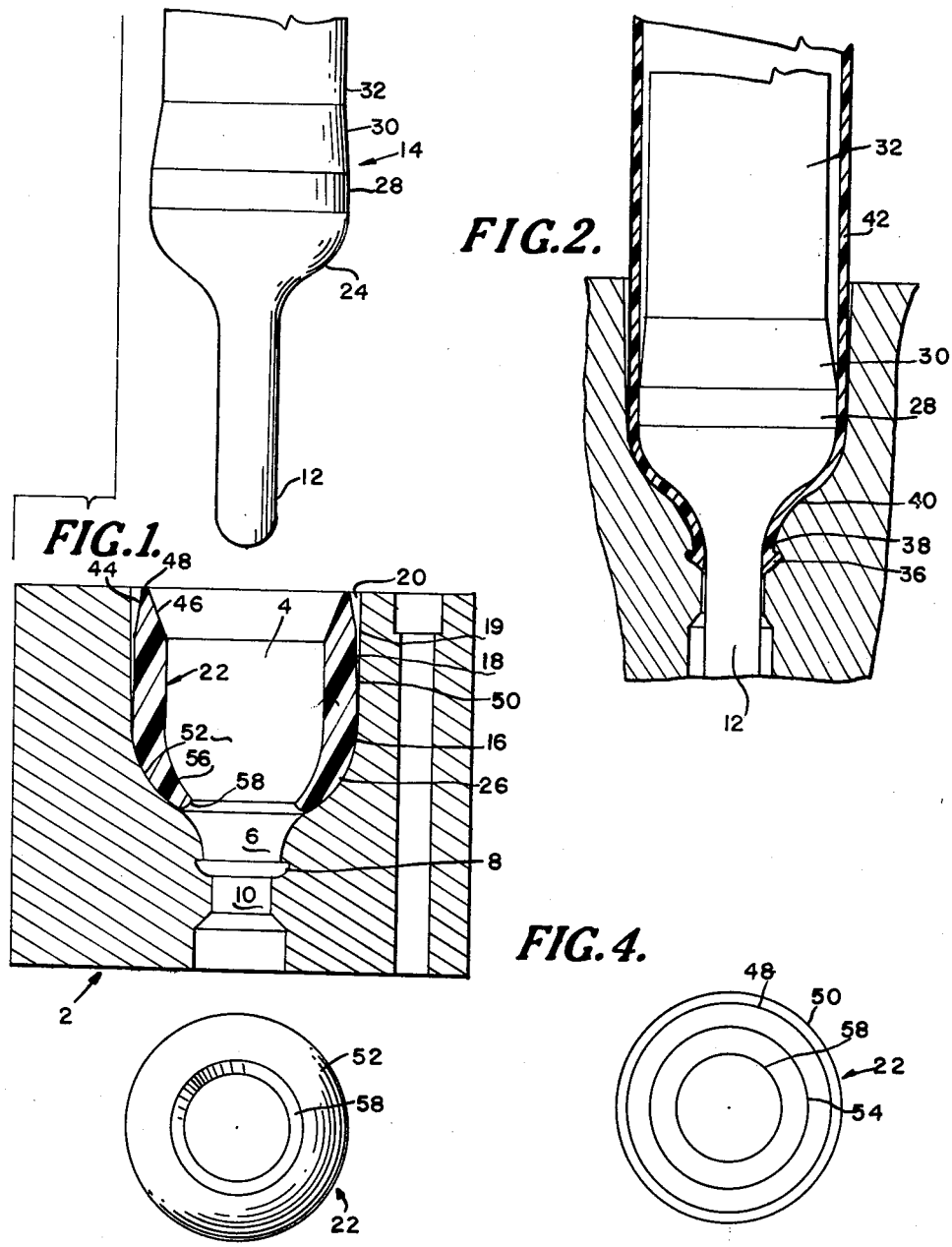
FIGURE 1 is a vertical section showing the plunger out of the die and the planchette or disc-shaped blank in the die prior to impact.
FIGURE 2 is a vertical section similar to FIGURE 1 showing a further stage where the plunger is in contact with the planchette and the polyethylene has gone well beyond the walls of the die and the molding step is complete.
FIGURE 3 is a bottom plan view of the planchette or disc-shaped blank.
FIGURE 4 is a top plan view of the planchette or disc-shaped blank.

Referring more specifically to FIGURE 1 of the drawings, there is provided a female mold 2. The die cavity 4 has a vertical axis of symmetry and has a bottom central cavity 6 having an annular recess 8 at the lower end thereof in order to form a tube having a bead at the end of the neck. Below the bottom cavity there is provided a guide 10 for the lead 12 of the plunger 14. From shoulder 16 the wall section 18 of the die cavity tapers upwardly to the upper end 20 at a very slight angle to the vertical axis e.g. 0°15' to form a frusto-conical portion. A planchette or disc-shaped blank 22 of polyethylene having a melt index of about 10 and a molecular weight of about 18,000 is inserted into the mold. The detailed construction of planchette or disc-shaped blank 22 is described hereinafter.

To form the planchette or disc-shaped blank 22 into a tube there is thrust or impacted thereon plunger 14. The plunger has a vertical axis of symmetry and includes a vertically walled lead 12 which has substantially the same diameter as the guide 10. The plunger is contoured outwardly and upwardly at 24 from lead 12 to land section 28 to matingly engage the corresponding wall section 26 of mold wall 18. The land 28 has a vertical side wall. The plunger 14 is tapered back at 30 from the land to a vertically walled stem portion 32 of lesser diameter than the land. It has been found that by having the reduced wall portion 32 on the plunger there is eliminated much of the undesirable friction which would otherwise result as the tube rides up the punch during the forming operation. Due to the slight taper in the upper portion 19 wall section 18 of the die while the corresponding wall of the land 28 is vertical, the space between the land and the die wall becomes progressively less as the plunger descends into the die cavity. This has the advantage that it allows the polyethylene to move freely and expand and to relieve the built-up pressure so that the tube wall will build up substantially uniformly. The 0°15' taper on the die wall also permits the polyethylene to relax a little during the forming operation.

After the finished container 34 terminating in bend 36 and having a reduced diameter open neck 38 with conical wall 40 connecting the neck with the main vertically walled section 42 is formed by impacting the plunger 14 into the die, the plunger is removed from the die. The tube adheres to the plunger and can be readily removed therefrom by applying air pressure to blow off the tube.

In the specific example described in connection with FIGURES 1 and 2, the female mold was heated to 200° F., while the plunger was at 70° F. Alternatively, the mold can be heated to 170° F. or need not be heated. In another example, the plunger and die were at 130° F. In a third example, the plunger was at 70° F. and the die at 115° F. It is possible to carry out the impact extrusion wherein the die, plunger and planchette or any of them are at room temperature, i.e. 70° F., or 175° F. or 200° F. or wherein they have any temperature between 65° F. and 200° F. It is not necessary that the die, plunger and planchette or any two of them have the same temperature as successful results are obtained when they have differing temperatures. The plunger was impacted on the planchette with a force of 15,000 pounds p.s.i. to form a tube 4.5 inches high.

By the process of the present invention, there is obtained a straight-edged tube of the thermo-plastic synthetic resin which requires no trimming after it is formed.

In the example illustrated by FIGURES 1 and 2 the maximum diameter of the die cavity 4 at the upper end was 0.9115 inch, the vertical height of the wall section 18 including tapered portion 19 and curved portion 26 was 4.906. The angle of taper of outwardly tapered section 17 was 0°15'. The curved portion 26 had a upper diameter of 0.905 inch and was filleted at 0.3125 inch radius. The wall of the cavity 6 was curved and filleted at a 0.25 inch radius to merge into curved portion 26 to form the neck of the container at its lower end cavity 6 had a diameter of 0.3125 inch and merged into recess 8 having a maximum diameter of 0.375 inch. The recess had a height of 0.031 inch. Below the recess 8 the guide 10 had a diameter of 0.25 inch. The height of the cavity 6 and recess 8 together was 0.125 inch. The maximum diameter of the land 28 on the punch was 0.875 inch and the land had a vertical height of 0.375 inch.

It is frequently desirable to treat the planchette or disc-shaped blank of polyethylene or polypropylene with a lubricant, e.g. glycerine, wax or a silicone prior to the forming operation. Preferably, there is employed dimethyl polysiloxane to form a thin surface film on the planchette. The planchette or disc-shaped blank is then molded in the manner set forth. Alternatively, the mold itself can be lubricated with the silicone directly.

It is possible to form tubes in less than one second by the present procedure.

As previously set forth one of the most important novel features contributing to the success of the present invention is the use of a special inbending planchette or disc-shaped blank 22.

For use with the mold just described the planchette or disc-shaped blank has a height of $55/64$ inch. The planchette or disc-shaped blank has the general shape of a hollow tube which is inbent at the bottom. The planchette or disc-shaped blank has an inwardly tapered outer wall 44 for the upper $3/16$ inch (vertical distance) thereof. The angle of taper is 5°. The inner wall 46 is tapered outwardly for the upper $3/16$ inch (vertical distance) at an angle of 25°. The inner wall 46 merges into the outer wall 44 in a rounded edge 48. The maximum outer diameter of the planchette or disc-shaped blank which is 0.895 inch begins at the bottom of tapered outer wall 44 and is continued downwardly as vertical wall 50 to a point $19/32$ inch below the top of the planchette (i.e. the vertical wall has a height of $13/32$ inch). At the lower end the wall 50 terminates in the arc 52 of a circle having a radius of $5/8$ inch with the center inside the hollow portion of the planchette or disc-shaped blank. The arc 52 has a vertical distance of $17/64$ inch with the result that the planchette has a height of $55/64$ inch as previously set forth. The outer diameter of the planchette or disc-shaped blank at the bottom of arcuate wall 52 is $15/32$ inch. The maximum inner diameter of the planchette or disc-shaped blank which is 0.633 inch begins at the bottom of tapered wall 46 and is continued downwardly as a vertical wall 54 to a point $1/2$ inch below the top of the planchete (i.e. the vertical wall has a height of $5/16$ inch). At the lower end the wall 54 terminates in the arc 56 of a circle having a radius of $7/16$ inch with the center inside the hollow portion of the planchette or disc-shaped blank. The inner diameter of the planchette at the bottom of arcuate wall 56 is $5/16$ inch. It will be observed that the inner wall 56 terminates slightly above outer wall 52 and the two walls are joined by inwardly tapered end wall 58.

It has been found by utilizing a planchette or disc-shaped blank of the type just described having differentiating inner and outer curves, with the inner curve having a smaller radius that it is possible to form shoulders during the impact extrusion without having a pimple effect. The design of the planchette or disc-shaped blank avoids congestion at the shoulder and permits maintaining the proper thickness of material at this shoulder. Since the planchette or disc-shaped blank undergoes a compressing or squeezing action during impact extrusion and since the shoulder of the neck is of smaller diameter than the main body of the tube it is desirable to narrow the walls of the planchette or disc-shaped blank as they approach the bottom.

The outside diameter of the planchette or disc-shaped blank is slightly less than the diameter of the die. The fit can be either snug or loose and the planchette or disc-shaped blank can rock about a point. It has been found that by not fitting the contour of the blank exactly to that of the die the tendency to wrinkle is overcome. While not being limited to any theory of action it is believed that the success of the invention is due at least in part to the fact that there is both a downward and an upward movement of the polyethylene as the plunger hits the planchette or disc-shaped blank. As a result there is no necking in and the stress cracking problem is solved.

The slight inward taper at the top of the outside wall of the planchette or disc-shaped blank aids in preventing bell melting.

While the polyethylene employed in the specific example was unirradiated there can be employed irradiated polyethylene as previously set forth. For example the resistance of the finished tubes to stress cracking can be further increased by replacing the polyethylene employed in the examples by utilizing the same polyethylene which had been previously irradiated with electrons to a dosage of 2 megarad. When utilizing irradiated polyethylene it is necessary to increase the force of the impacting plunger in order to obtain the same amount of extrusion.

We claim:

1. A planchette of a solid polymer of an olefin having 2 to 3 carbon atoms, said planchette having top, middle and bottom portions and an outer wall and an inner wall, said inner wall defining a central cavity extending through said planchette, said outer wall and said inner wall bending inwardly at the bottoms thereof to form said bottom portion of the planchette of decreasing thickness as compared with said middle portion.

2. A planchette of solid polyethylene, said planchette having top, middle and bottom portions, an outer wall and an inner wall, said inner wall defining a central cavity, extending through said planchette, said outer wall curving inwardly at the bottom thereof and said inner wall also curving inwardly at the bottom thereof with a radius of curvature greater than that of the outer wall whereby there is formed a bottom portion of the planchette of graduated lesser thickness than said middle portion.

3. A planchette according to claim 2 wherein the top portion of the outer wall tapers inwardly and upwardly and the top portion of the inner wall tapers outwardly and upwardly at a considerably greater angle of taper than that of the top portion of the outer wall.

4. A planchette according to claim 3 wherein the bottom of the inner wall terminates slightly above the bottom of the outer wall and they are joined by an inwardly and upwardly tapered bottom wall.

5. A planchette according to claim 4 wherein the top of the outer wall and the top of the inner wall are joined at a rounded edge.

6. A planchette according to claim 5 wherein the polyethylene is irradiated.

7. In a process of impact extruding a solid polymer of an olefin having 2 to 3 carbon atoms to form a hollow tube having a head of reducing internal diameter and with reduced tendency to stress crack the improvement comprising impacting a plunger on a disc shaped blank of a solid polymer of an olefin having 2 to 3 carbon atoms, said disc-shaped blank having top, middle and bottom portions and an outer wall and an inner wall, said inner wall defining a central cavity extending through said disc-shaped blank, said outer wall and said inner wall bending inwardly at the bottoms thereof to form said bottom portion of the disc-shaped blank of decreasing thickness as compared with said middle portion.

8. In a process of impact extruding polyethylene to form a tube having a head of reduced internal diameter the improvement comprising impacting a plunger on a disc-shaped blank of solid polyethylene, said disc-shaped blank having top, middle and bottom portions, an outer wall and an inner wall, said inner wall defining a central cavity, extending through said disc-shaped blank, said outer wall curving inwardly at the bottom thereof and said inner wall also curving inwardly at the bottom thereof with a radius of curvature greater than that of the outer wall whereby there is formed a bottom portion of the disc-shaped blank of graduated lesser thickness than said middle portion.

9. A process according to claim 8 wherein the outer wall of the top portion of the disc-shaped blank tapers inwardly and upwardly and the top portion of the inner wall of the disc-shaped blank tapers outwardly and upwardly at a considerably greater angle of taper than that of the top portion of the outer wall.

10. A process according to claim 9 wherein the bottom of the inner wall of the disc-shaped blank terminates slightly above the bottom of the outer wall and they are joined by an inwardly and upwardly tapered bottom wall.

11. A process according to claim 10 wherein the top of the outer wall and the top of the inner wall of the disc-shaped blank are joined at a rounded edge.

12. A planchette according to claim 1 wherein the outer and inner walls present a smooth uninterrupted outline.

References Cited in the file of this patent

UNITED STATES PATENTS

| | | |
|---|---|---|
| 1,782,360 | Lynch | Nov. 18, 1930 |
| 1,966,877 | Witte | July 17, 1934 |
| 2,130,254 | Visman | Sept. 13, 1938 |
| 2,139,541 | Farnsworth | Dec. 6, 1938 |
| 2,203,376 | Witte | June 4, 1940 |
| 2,232,475 | Renfrew et al. | Feb. 18, 1941 |
| 2,418,155 | Bogoslowsky | Apr. 1, 1947 |
| 2,700,211 | Woolf | Jan. 25, 1955 |
| 2,764,804 | Arness | Oct. 2, 1956 |
| 2,877,500 | Rainer | Mar. 17, 1959 |
| 2,953,816 | Kidder | Sept. 27, 1960 |
| 2,919,473 | Cole | Jan. 5, 1960 |
| 2,987,775 | Albrecht et al. | June 13, 1961 |

FOREIGN PATENTS

| | | |
|---|---|---|
| 558,891 | Belgium | July 31, 1957 |
| 481,025 | Canada | Feb. 12, 1952 |